Dec. 12, 1961 W. ZIEG 3,012,604
METHOD OF AND APPARATUS FOR THE CORRUGATION OF PAPER TUBES
Filed Dec. 22, 1959 4 Sheets-Sheet 4
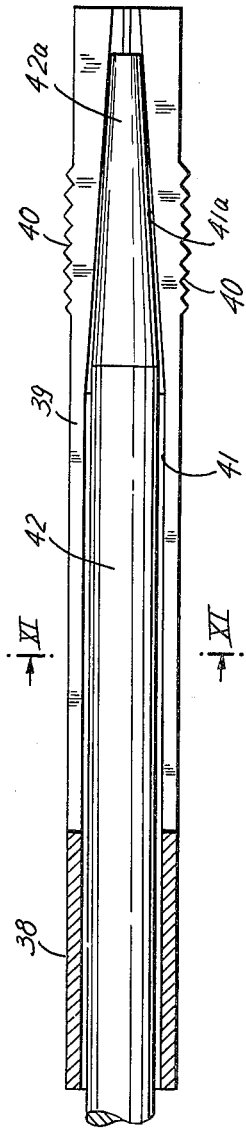
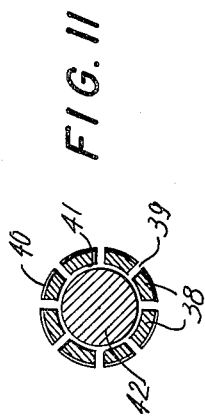
INVENTOR:
WILHELM ZIEG
BY
ATTORNEY

United States Patent Office 3,012,604
Patented Dec. 12, 1961

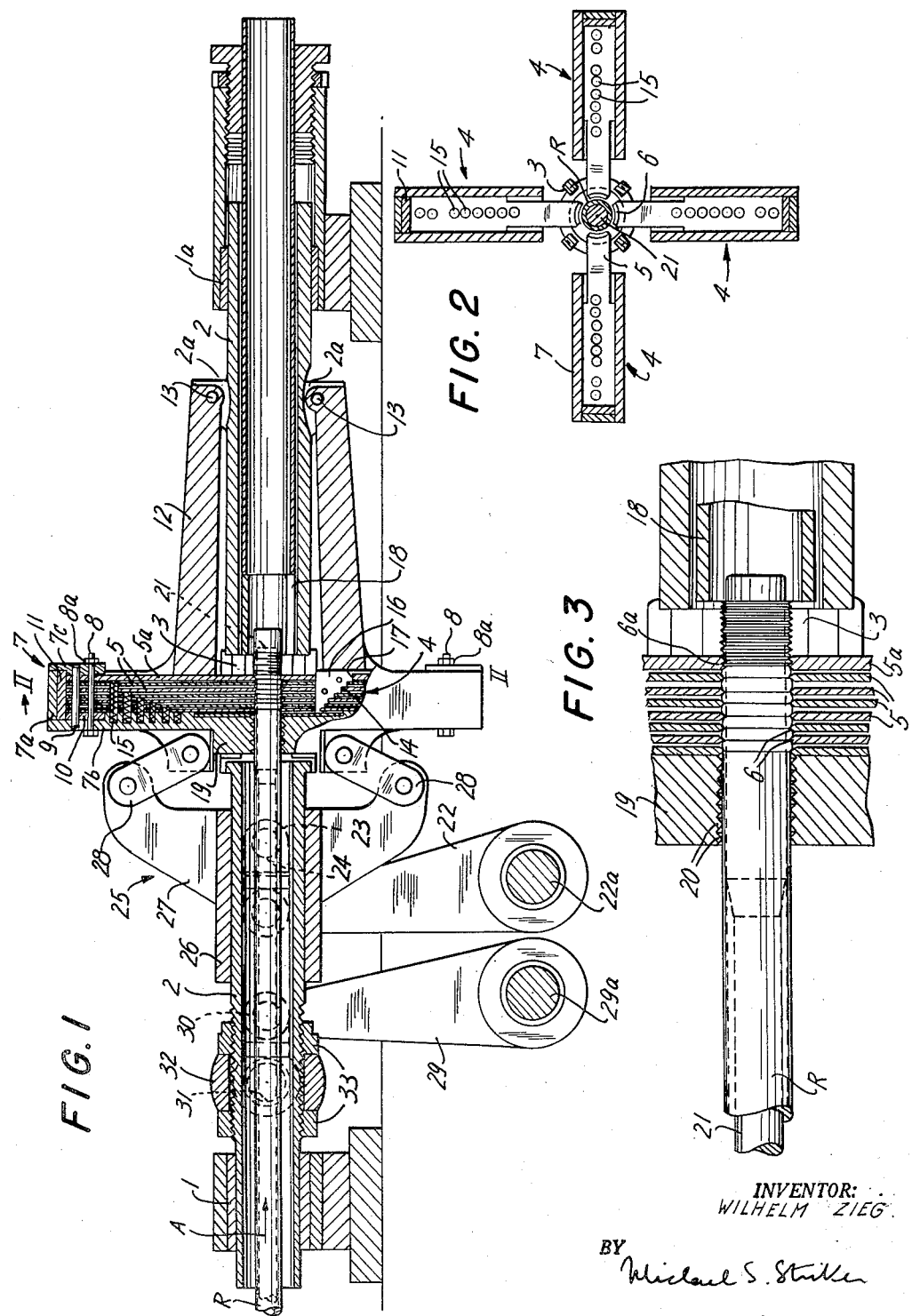

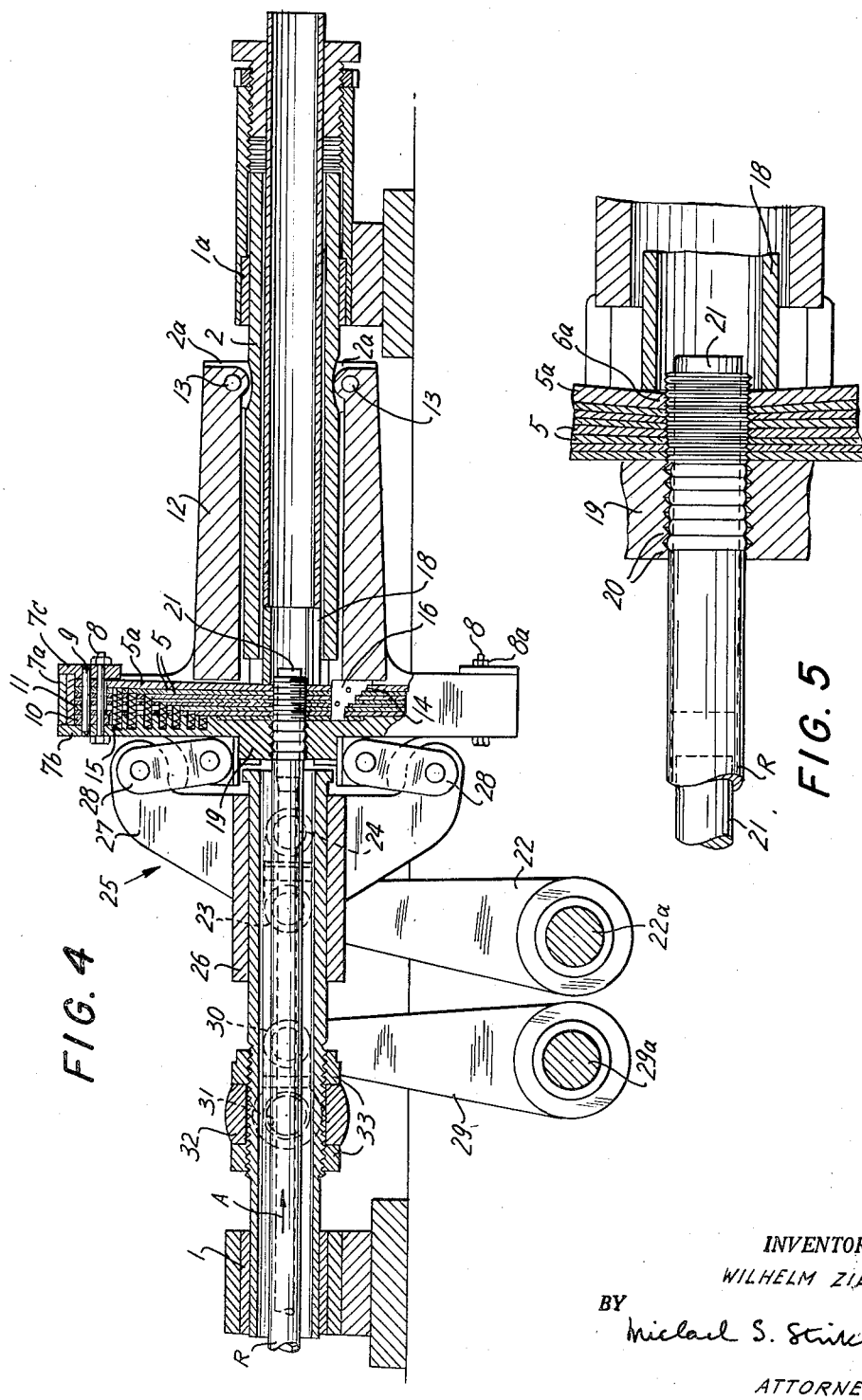

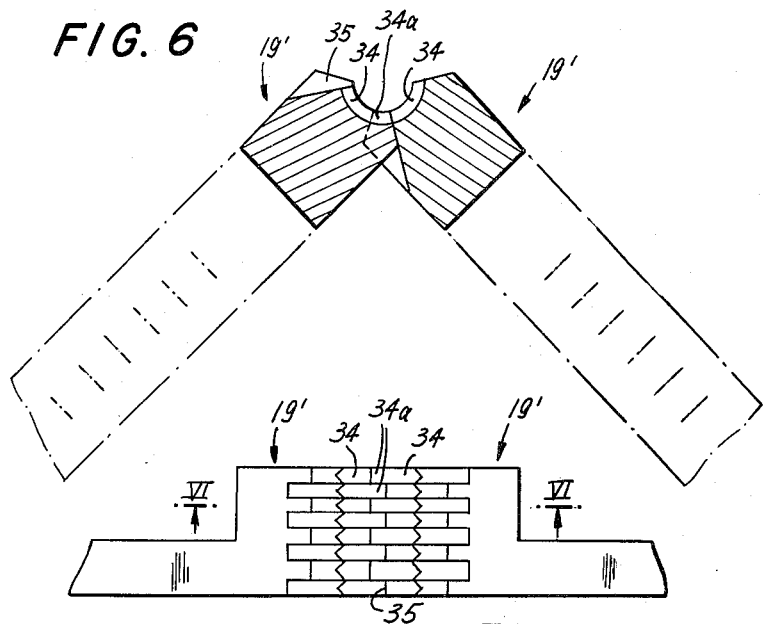
FIG. 6
FIG. 7
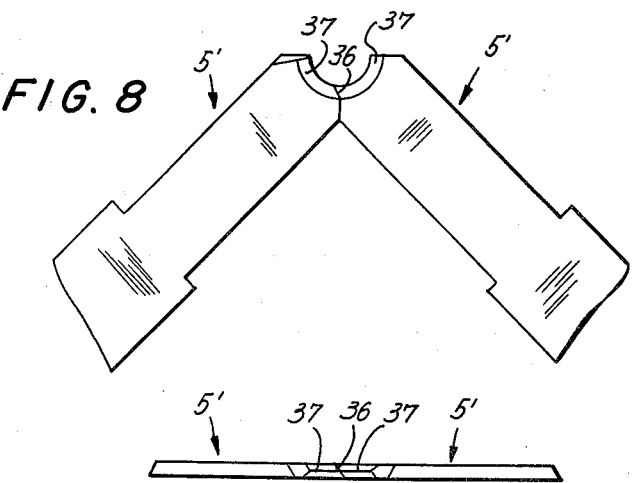
FIG. 8
FIG. 9
INVENTOR:
WILHELM ZIEG
BY
ATTORNEY.

3,012,604
METHOD OF AND APPARATUS FOR THE CORRUGATION OF PAPER TUBES
Wilhelm Zieg, Konigsberg, Bavaria, Germany, assignor to Frankische Isolierrohr- und Metallwaren-Werke Gebruder Kirchner, Konigsberg, Bavaria, Germany
Filed Dec. 22, 1959, Ser. No. 861,299
Claims priority, application Germany Dec. 23, 1958
22 Claims. (Cl. 156—339)

The present invention relates to a method of and to an apparatus for forming circumferential corrugations in tubular bodies, such as insulating sheaths for electric conductors and the like. More particularly, the invention relates to the method of and to an apparatus for the manufacture of flexible tubular bodies whose flexibility is due to the formation of circumferential corrugations. Among others, the invention may be practiced in connection with tubular bodies made solely of paper, with tubes made of paper and having an internal and/or external sheet-metal covering, as well as with tubular bodies consisting of one or more layers of sheet metal, i.e. the tubular products which are rendered flexible in accordance with the method and with the help of the apparatus of my present invention may, but need not, embody an insulating layer.

An important object of the present invention is to provide a method of rapidly corrugating tubular bodies made of electrically insulating or conducting material which may be practiced in connection with tubular bodies of circular, nearly circular or polygonal cross-sectional contour, and which may be practiced in connection with tubular bodies of widely different dimensions.

Another object of the invention is to provide a method of the above outlined characteristics according to which a one-piece or multi-layer tubular body of circular or polygonal cross-sectional contour may be provided with circumferential corrugations during a single passage through the corrugating apparatus.

A further object of my invention is to provide a method according to which the circumferential corrugations in a tubular body are formed in such a way as to insure long wear of corrugating instrumentalities and to prevent shifting of individual layers if the tubular body consists of two or more tubular components.

A concomitant object of the instant invention is to provide an apparatus for the practice of my invention which is of very simple construction, which occupies little space, which may be readily adapted for use with tubular bodies of different configuration, and which may be operated in a fully automatic way to require little or no attention during its operation.

An additional object of the present invention is to provide a corrugating apparatus for tubular bodies made of paper and/or sheet metal which is of such construction as to prevent any crushing of the work piece during the corrugating operation and which is capable of simultaneously forming circumferential corrugations in a comparatively long peripheral area of the tubular work piece.

A further object of the invention is to provide a corrugating apparatus of the above outlined characteristics which is capable of simultaneously corrugating the inner side and the outer side of a tubular work piece.

With the above objects in view, the invention resides in the provision of a method according to which the tubular work piece is corrugated in a series of consecutive operations each including corrugating a selected length of the work piece and preferably partially corrugating that zone of the work piece which is to be corrugated in the immediately following step. During each corrugating operation, the interior of the work piece is supported against crushing and, if necessary, circumferential corrugations may be formed not only in the outer side but simultaneously also in the inner side of the work piece, particularly when the latter consists of two or more layers of metallic material, e.g. sheet metal. The formation of partial and final circumferential corrugations is brought about by subjecting the tubular work piece to the action of radially movable axially reciprocable instrumentalities which are adapted to entrain the work piece in one direction longitudinally of the work piece and to return without the work piece in the opposing direction so as to move those instrumentalities which impart final corrugations to the work piece into alignment with the latter's precorrugated zone. At the same time, the precorrugating instrumentalities move into alignment with a smooth or untreated zone of the work piece.

The improved apparatus for the practice of my method comprises a plurality of uniformly spaced corrugating units which are movable in radial directions toward and away from the tubular work piece and which are also capable of performing reciprocatory movements in the longitudinal, i.e. axial, direction of the work piece. To that end, the corrugating units are pivotally connected with a feed pipe which serves as a guideway for receiving and conveying the workpiece and is formed with suitable cutouts for the entry of actual corrugating members into contact with selected peripheral zones of the work piece. The corrugating members are of laminar configuration and are formed with suitable claws which deform the periphery of the work piece upon movement of the respective corrugating units radially inwardly through the corresponding cutouts in the feed pipe and upon subsequent axial displacement of the laminar corrugating members toward each other in the longitudinal direction of the work piece. The corrugating members are constantly biased in directions away from each other and are caused to move toward each other only upon engagement with the work piece and with suitable stationary arresting or stop means so as to impart to the work piece final deformation resulting in the formation of circumferential ribs and grooves characteristic of a corrugated body. The feed pipe is reciprocable from and into a starting position together with the corrugating units and their laminar corrugating members.

Each corrugating unit preferably comprises a precorrugating component consisting of a die member formed with grippers which move into engagement with a smooth or untreated zone of the work piece before the latter's previously precorrugated zone is engaged by the laminar corrugating members. The grippers of the precorrugating die members are rigidly connected with each other and their spacing corresponds to the spacing of laminar corrugating members at the outset of a corrugating operation.

The corrugating apparatus further comprises means for internally supporting that zone of the work piece which is subjected to the action of aforementioned corrugating units so as to prevent a crushing or collapse of the work piece under the impact of corrugating members and of the grippers of precorrugating dies. The supporting means preferably assumes the form of a mandrel whose periphery is usually smooth when the work piece consists of a single layer or of two or more layers of such material that the layers cannot be shifted with respect to each other during the successive corrugating steps. However, if the work piece consists of two or more tubular metallic layers, it is advisable to form the mandrel as a slotted radially expandable hollow body whose outer side is formed with circumferential ribs entering into the inner side of the work piece between the grippers of the precorrugating die members in order to positively prevent axial shifting of the metallic layers. In such instances, the mandrel receives an elongated rod-like spreading member which, when axially shifted with respect to the mandrel, causes the latter to expand or contract in order to alternately engage and become separated from the inner side of the work piece.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 1 is a longitudinal central section through the corrugating apparatus with a tubular work piece in position to receive a series of circumferential corrugations but with the corrugating members in retracted or idle position;

FIG. 2 is a transverse section taken along the line II—II of FIG. 1, as seen in the direction of arrows;

FIG. 3 is a greatly enlarged fragmentary detail view of the corrugating members in the idle position of FIG. 1;

FIG. 4 illustrates the apparatus in the view of FIG. 1 but with the corrugating members in operative position, i.e. during the formation of circumferential corrugations in the peripheral zone of a tubular work piece;

FIG. 5 is an enlarged fragmentary detail view of the corrugating members in operative position during the formation of corrugations in a portion of the work piece;

FIG. 6 is a detail sectional view showing the means for partially corrugating the tubular work piece prior to the final corrugation, said means being slightly different from those shown in FIGS. 1 and 4 and the section of FIG. 6 being taken along the line VI—VI of FIG. 7, as seen in the direction of arrows;

FIG. 7 is an end view of the modified pre-corrugating means shown in FIG. 6;

FIG. 8 illustrates in side elevational view two modified laminar corrugating members for use in the apparatus of FIGS. 1 to 5;

FIG. 9 is an end view of the corrugating members shown in FIG. 8;

FIG. 10 is partly elevational and partly sectional view of means for internally supporting a tubular work piece during the corrugating operation, the construction of such supporting means being particularly suitable for use in connection with multi-layer work pieces consisting of a metallic material; and FIG. 11 is a transverse section taken along the line XI—XI of FIG. 10, as seen in the direction of arrows.

Referring now in greater detail to the illustrated embodiments, and first to the apparatus of FIGS. 1 to 5, there is shown a pipe 2 which is axially shiftable in a pair of spaced bearings 1, 1a. In the following description, the member 2 will be called the advancing or feed pipe, its purpose being to convey or feed the tubular work piece R in a direction toward and beyond the corrugating stations. The elongated tubular body or work piece R advances in stepwise fashion with the feed pipe 2, as will be fully explained hereinafter, the advance of the workpiece occurring in a direction from the left to the right of FIGS. 1, 3, 4 and 5, as indicated by the arrow A. Thus, the feed pipe 2 actually constitutes a tubular guideway for the work piece R and is reciprocable from and back into the starting position of FIG. 1.

In the corrugating zone, the feed pipe 2 is formed with four radially arranged openings or cutouts 3 for permitting the passage of certain elements forming part of four radially arranged corrugating units or buckling jaws 4 (see FIG. 2). These corrugating units are equally spaced from each other and are pivotable, in a fashion resembling the movements of jaws in a pair of pliers or tongs, toward and away from tthe periphery of the work piece R. When in contact with the latter, the corrugating units 4 form a composite corrugating assembly which completely surrounds a selected portion of the work piece, i.e. that length which is in part pre-corrugated and in part completely corrugated in a single operating step.

Each corrugating unit or buckling jaw 4 comprises a series of laminae or plates 5 arranged in planes perpendicular to the axis of the feed pipe 2 and movable radially with respect to the latter. Each plate-like corrugating member 5 is formed at its inner end with a claw 6 which constitutes the actual corrugating means as it deforms the body of the tubular work piece R upon movement radially through the corresponding cutout 3 and toward the latter, and thereupon in the axial direction and to the right of the feed pipe 2. Each claw 6 of one corrugating unit or composite jaw 4 forms with one claw of the other three corrugating units a closed endless annular body about the work piece R when the jaws are moved radially toward the latter.

The last (right-hand) plate 5a of each corrugating unit 4 is thicker than the other corrugating members 5 and is formed with a pair of claws 6a, as best shown in FIGS. 3 and 5. The corrugating member 5a is subjected to greater stresses than the members 5 as it transmits a buckling or axially compressing force to the tubular work piece R and, consequently, the gripping action of its twin claws 6a must be even more secure than that of the simple claws 6.

The members 5, 5a of each corrugating unit 4 are mounted in a composite housing 7 which latter forms part of the respective corrugating unit and consists of a frame member 7a, a front plate 7b and a comparatively small rear plate 7c. Each housing 7 has an open side which is turned toward the work piece R. The components 7a, 7b, 7c of each housing 7 are held together by a bolt 8 and a nut 8a, and are loosely mounted on a pin 9 whose axis is parallel with the axis of the feed pipe 2 and with the longitudinal direction of the work piece. A spacer or separating member, shown in FIGS. 1 and 4 as a plate 10, is inserted between the front plate 7b and the adjacent corrugating member 5 in each of the four housings or casings 7. The holes formed in the separating plates 10 and in the members 5, 5a of each corrugating unit 4 allow for considerable play of the respective bolt 8 and pin 9, i.e. the plates 10 and members 5, 5a are movable relative to the bolts 8 and pins 9 in their respective housings in directions radially of the feed pipe 2. The thickness of separating members or spacers 10 is selected in such a way that a set of corrugating members 5, 5a in the respective housing 7 may move toward and away from each other within a given range, i.e. that the spacing between the adjacent corrugating members of each corrugating unit 4 may be varied between that shown in FIG. 3 and the one shown in FIG. 5. During the actual corrugating operation, the outer end faces of laminar corrugating members 5, 5a abut against the pressure plates 11 one of which is mounted in each housing 7 adjacent to the respective frame member 7a (see FIGS. 1 and 4). The claws 6, 6a of members 5, 5a project through the open sides of the respective frames or housings 7.

Each housing 7 comprises an extension or arm 12 which projects in a direction toward the right, i.e. in the direction in which the work piece R advances. The free end of each arm 12 is pivotably fixed by a pivot axle 13 to one of four radial lugs or brackets 2a carried by the feed pipe 2. When the arms 12 are pivoted about their respective pivot axles in one direction, the corrugating units 4 are moved away from the periphery of the work piece R, i.e. into their open or inoperative positions. When the arms 12 pivot in the opposing direction, the corrugating units 4 move into closing or operative position, that its, the claws 6, 6a engage with the work piece R. When the feed pipe 2 is axially advanced in its bearings 1, 1a from and into the starting position of FIG. 1, the pivot axles 13 cause the corrugating units 4 to participate in such displacement.

In order to insure that the members 5, 5a of each corrugating unit 4 are properly spaced from each other when coming into engagement with the peripheral zone of the work piece R, there is provided a stop or arresting member 16 in each of the four housings 7; each arresting member is formed with a series of steps or shoulders 14, one for each of the corrugating members 5, 5a, and the corrugating members are constantly urged into abutment with the respective steps 14 by a series of resilient elements shown in the drawings as helical expansion springs 15. As is shown in FIG. 1, each spring 15 is mounted at the inlet side and each arresting member 16 is mounted at the exit- or discharge-side of the respective housing 7, the springs 15 acting between the front plate 7b and the respective corrugating member to urge the latter against the corresponding step or abutment means 14 on the arresting member 16. The springs 15 and the arresting members 16 insure such spacing of the members 5, 5a (see FIG. 3) that the claws 6, 6a are separated from each other a distance corresponding to the position of shallow grooves formed in the tubular work piece R in a preceding partial corrugating operation. The plane of each arresting member 16 is perpendicular to the planes of members 5, 5a in each housing 7, and the depth of steps 14 determines the spacing of claws 6, 6a in each corrugating unit at the start of a corrugating operation. As is best shown in FIG. 4, each of corrugating members 5, 5a is formed with a cutout 17 whose dimensions are such as to permit movements of each lamination into abutment with the respective step 14. Thus, the length of cutouts 17 in adjacent members 5 increases radially outwardly in a direction in which the work piece R advances (i.e. from the left to the right of FIGS. 1, 3, 4 and 5, and toward the right-hand corrugating members 5a).

A hollow stationary cylindrical member 18 is installed within the feed pipe 2 at the right-hand side of the corrugating station. Its left-hand end face constitutes a stop for the corrugating members 5a of the four corrugating units 4, i.e. it arrests the members 5a in such position in which their claws 6a are in firm engagement with the tubular work piece R (see FIGS. 4 and 5). When the members 5a come into abutment with the cylindrical stop 18, and if the front plates 7b of each housing 7 continue to advance in a direction to the right, the members 5 are moved into abutment with each other and close to the respective front plate 5a against the action of their expansion springs 15, such movement of members 5 with respect to each other and with respect to the corrugating members 5a being continued until they reach the position of FIGS. 4 and 5 in which the corrugating members of each corrugating unit 4 form a composite structure and are in full side-to-side abutment with each other.

At the inlet (left-hand) side of each corrugating unit 4, the front plates 7b are connected to or integrally formed with die members or cheeks 19 whose inner end faces are formed with a series of rib-like grippers or claws 20 (best shown in FIGS. 3 and 5), the die members 19 and their grippers or claws 20 constituting means for partially corrugating a selected length of the work piece R before the same length is acted upon by the claws 6, 6a of corrugating members 5, 5a, respectively, at the adjacent final corrugating station. The spacing between the grippers 20 on each die member 19 cannot be varied and corresponds to the distance between the claws 6 at the start of a corrugating operation (FIG. 3). The function of die members 19 is to pre-groove or pre-corrugate the peripheral zone of the work piece, i.e. to take up a part of the work which would otherwise be performed by the claws 6, 6a whereby the wear and tear on the latter is reduced and the corrugating apparatus may be put to extended use without requiring interchange of the members 5, 5a in its corrugating units. The number of grippers 20 corresponds to that of claws 6. When the corrugating units 4 are pivoted (about the pivot axles 13) into engagement with the work piece R, the die members 19 form a closed annulus about a selected length of the tubular body R and move with the latter when it advances in a direction to the right.

An elongated, fixed, smooth cylindrical mandrel or core bar 21 extends into the work piece R in a direction from the left-hand end of the feed pipe 2, and its right-hand end extends beyond the position of claws 6 and 6a. The purpose of the mandrel 21 is to serve as an internal support for the work piece R against the radial pressure of claws 6, 6a and grippers 20, i.e. the mandrel prevents a crushing of the work piece during the corrugating operation.

The tong-like opening and closing movements of corrugating units 4 about the pivot axles 13 are brought about by an oscillatable two-armed lever 22 (only one arm of this lever being shown in FIGS. 1 and 4). The lever is pivotably mounted on a stationary pin 22a, and each of its parallel arms is articulately connected with a link 23 (only one shown) which latter, in turn, is articulately mounted on a stud 24 of the closing head 25. The member 25 comprises a cylindrical sleeve 26 which is axially slidable about the feed pipe 2. The sleeve 26 carries four uniformly spaced radial wings 27 whose outer ends are articulately connected with toggle links 28. The inner end of each link 28 is pivotably connected to one of the housings 7. Each wing 27 preferably consists of two parallel plates (which overlap in FIGS. 1 and 4), and the toggle links 28 are pivotably received between such pairs of plates.

In operation, and starting from the position of the apparatus as shown in FIG. 1, the lever 22 is pivoted in clockwise direction to advance the sleeve 26 in a direction to the right into the position of FIG. 4, i.e. in a direction toward the corrugating units 4, whereby the corrugating units and the die members 19 move steadily in a radial direction toward the work piece R under the action of links 28 and while pivoting about their respective axles 13. During such movement, the die members 19 are first to come into contact with the work piece R, i.e. the grippers 20 engage with the latter's periphery before the corrugating action of claws 6 and 6a can begin. The grippers 20 bring about a partial or preliminary corrugating action by partially deforming a selected length of the tubular body R. The action of claws 6 begins shortly thereafter; these claws engage the partially corrugated zone of the work piece and enter exactly into the grooves formed by the members 20 in a preceding operation. During the corrugating operation, the claws 6, 6a and grippers 20 surround that portion of the work piece R which is internally supported by the smooth outer surface of the mandrel 21. At the start of each corrugating step, the members 5, 5a in each corrugating unit 4 are still spread or spaced from each other in fan-like fashion, as is shown in FIG. 3.

A second oscillatable lever 29, pivotable about a stationary pin or shaft 29a, brings about an advance of the feed pipe 2 from its starting position at the above-described stage of the corrugating operation. The lever 29 advances the feed pipe 2 at the exact speed of the head 25 while the claws 6, 6a, 20 are in engagement with the work piece R, i.e. no relative axial displacement of the body R with respect to the feed pipe 2 takes place during the clockwise rocking movement of the advancing lever 29. The non-represented forked end of the lever 29 is articulately fixed to a pair of links 30 (one shown in FIGS. 1 and 4) which are pivotably connected to studs 31 carried by a sleeve-like head 32. The latter is releasably fixed to the feed pipe 2 by means of adjusting nuts 33 which permit axial adjustments of the head 32 along the feed pipe. The corrugating units 4 participate in the axial displacement of the feed tube 2 owing to the pivotal connections 12, 13, 2a between the pipe 2 and the respective housings 7.

In the next step, the front claws 6a come into firm engagement with periphery of the work piece R and, as the lever 22 continues to advance the head 25 and the lever 29 continues to advance the feed pipe 2 with the corrugating units 4 in a direction to the right, the right-hand corrugating members 5a come into abutment with the cylindrical stop 18 while the members 5 are still spaced from each other under the action of expanding springs 15. As the clockwise advance of the lever 22 continues, the corrugating members 5 are moved toward and into side-to-side abutment with each other (FIGS. 4 and 5) because the right-hand plates 5a are arrested by the stationary cylindrical stop 18. During such movement of the members 5 toward each other, i.e. against the spreading action of spring 15, the work piece R is corrugated because the grooves formed in its periphery by the claws 6 are shifted in the axial direction toward the composite annulus formed by the four claws 6a. The main corrugating action is brought about by the claws 6a while the claws 6 merely enter the preformed grooves or depressions in the adjacent peripheral zone of the work piece and cause the formation of pronounced ridges or beads between the adjacent grooves as they move in a direction to the right and hence toward the stationary twin claws 6a. As stated hereinbefore, the mandrel 21 prevents a crushing of the tubular body R during the corrugating step. It will be seen that the final corrugation of a selected length of the work piece R is brought about by the claws 6a in cooperation with the arresting cylinder 18, and by the axially shiftable claws 6 which deform the zones between the grooves formed by grippers 20 into characteristic circumferential ridges or beads best shown in FIG. 5. It will be noted that the toggle action of links 28 is such as to cause simultaneous movement of corrugating members 5, 5a in a direction to the right as well as radially inwardly toward the mandrel 21, i.e. that the action of claws 6, 6a upon the periphery of work piece R increases simultaneously with the progressing movement of the members 5 toward each other, that is, into the position of FIG. 5.

When the corrugating action upon a selected length of the tubular body R is completed, the movable parts of the apparatus are returned into the position of FIG. 1. In the first opening or releasing step, the lever 22 is pivoted in anticlockwise direction to move the head 25 in a direction to the left, whereby the toggle links 28 cause the die members 19 of all four corrugating units 4 to move radially outwardly and away from the work piece, i.e. the work piece is released by the claws 6, 6a and grippers 20. In the next stage, the lever 29 is also pivoted in anticlockwise direction to move the head 32 in a direction to the left, together with the feed pipe 2 which latter then entrains the corrugating units 4 and the die members 19. The work piece R remains stationary. The members 5, 5a of all four corrugating units 4 are thereby moved into a position adjacent to that zone of the work piece which was partially corrugated by the grippers 20 of die members 19 in the preceding corrugating operation. At the same time, the die members 19 move into alignment with a smooth, non-deformed portion of the work piece, whereupon the return- or opening-movement of the levers 22, 29 is arrested and the next corrugating operation may begin in the same manner as described hereinabove. Thus, the tube R is intermittently advanced in a direction to the right during each corrugating operation but remains stationary during the opening stage of the apparatus. In this manner, new zones of the work piece R are moved into alignment with the claws 6, 6a and grippers 20 at the start of a corrugating operation until the entire length of the work piece is rendered flexible by the formation of circumferential corrugations in its periphery.

It is preferred to provide a common drive shaft (not shown) for the actuating levers 22 and 29, and to operate these levers by means of suitable non-represented eccentrics, cams, bell-crank levers or connecting rods of any known design. It is also preferred to provide means for automatically operating the levers 22, 29 in a predetermined sequence so as to bring about the aforementioned tong-like movements of corrugating units 4 together with their respective die members 19 and corrugating members 5, 5a toward each other, and subsequent opening of the apparatus in the manner as described hereinabove.

FIGS. 6 and 7 illustrate a pair of slightly modified die members 19' having claw portions or grippers 34 for partially corrugating a tubular work piece. The sharp pre-corrugating edges 34a of each gripper or claw 34 alternate with gaps or voids 35 of such dimensions as to receive a portion of an edge 34a. As is best shown in FIG. 7, the edges or ribs 34a of one gripper 34 enter into the gaps 35 of an adjacent gripper when the grippers are moved into operative position to form a series of endless composite annuli about the non-represented work piece. For the sake of clarity, FIGS. 6 and 7 show only two die members 19' though the corrugating apparatus preferably comprises three, four or more such parts which are uniformly spaced about the periphery of the work piece. As is also shown in FIG. 7, the grippers 34 of adjacent die members 19' are axially staggered with respect to each other in order to permit entry of the edges or ribs 34a forming part of one die member into the gaps 35 formed in the adjacent die member. FIG. 6 shows that the length of each gripper 34 equals the length of one-fourth of a complete circle. Though it is possible to construct each die member 19' of a series of interconnected laminar elements, it is preferred to fabricate such die members of a single piece of suitable metallic or plastic material. The advantage of the pre-corrugating means shown in FIGS. 6 and 7 is in that (in contrast to the action of grippers 20 illustrated in FIGS. 1 and 4) no continuous ridges or burrs will form at the meeting edges of adjacent grippers 34, i.e. the grippers 34 improve the appearance of the corrugated product.

FIGS. 8 and 9 illustrate a modified construction 5' of corrugating members for use in the apparatus of FIGS. 1 to 5. The meeting end faces of claws 37 are inclined, as at 36. The end faces 36 are arranged in such a way that the claws 37 of adjacent members 5' intermesh or interlock with each other so that their corrugating edges form a continuous uninterrupted annulus about the periphery of the work piece.

When the work piece consists of paper alone or of paper which is internally and/or externally coated with a layer of sheet metal or the like, the smooth cylindrical mandrel 21 is capable of positively preventing a crushing of the work piece and at the same time also prevents a sliding movement of one layer with respect to the other layer or layers of a multi-layer tubular work piece. This is due to considerable friction between a paper tube and the layer or layers of metallic material, i.e. no shifting of such layers will take place during the corrugating operation as long as the metallic layers are separated from each other by a tubular body of paper-like material. However, when the work piece consists solely of two or more layers of sheet metal, i.e. with no paper layer therebetween, it is preferred to internally hold and support the work piece by means of the modified mandrel assembly shown in FIGS. 10 and 11. This assembly comprises a sleeve 38 which is fixed to and hence advances with the feed pipe 2, and which is formed with elongated axially parallel slots 39. The outer side of the sleeve 38 is formed with circumferential gripping ribs 40 which are adjacent to the pre-corrugating zone, i.e. aligned with the grippers 20 or 34. The exact mounting of the assembly shown in FIGS. 10 and 11 is such that each rib 40 is located between a pair of adjacent grippers 20 or 34 when the work piece is subjected to the preliminary or pre-corrugating action. The peripheral portion of the slotted sleeve 38 located to the right of circumferential ribs 40 is smooth, i.e. that portion of the slotted sleeve is of cylindrical contour. The cylindrical space 41 within the hollow sleeve 38 tapers inwardly in a direction toward the right, i.e. its right-hand end portion 41a is of conical contour and receives the conical end 42a of an elongated rod or spreading means 42 which latter is fixed to the head 25 of the corrugating apparatus; thus, the rod 42 follows the movements of the head 25 when the lever 22 is caused to reciprocate. The left-hand ends of the sleeve 38 and rod 42 extend beyond the rear end of the work piece; this renders it possible to fix the member 38 to the feed pipe 2 and the rod 42 to the head 25 of the corrugating apparatus without interfering with the advance of the work piece. The latter is preferably formed immediately adjacent to the left-hand end of the apparatus shown in FIGS. 1 and 4.

When the head 25 and the rod 42 advance in a direction to the right, i.e. when the head 25 closes the die members 19 or 19' in a direction toward the selected peripheral zone of the work piece R, the conical end 42a slides into the conical end portion 41a of the bore 41 and thus spreads the slotted portion of the sleeve 38 whereby the circumferential ribs 40 engage with and penetrate into the work piece sufficiently to prevent any axial displacements of its layers. In other words, the ribs 40 bring about the formation of internal corrugations in the tubular work piece, the circumferential grooves of such internal corrugations being located between the adjacent grippers 20 or 34 of the cooperating die members 19 or 19', respectively. It can be said that the ribs 40 constitute a set of counter-claws whose action is complementary to that of the grippers 20 or 34 during the partial corrugation of a tubular work piece, particularly when the latter comprises two or more layers of sheet metal without a friction-generating paper or like layer therebetween. While the ribs 40 and the grippers 20 or 34 engage with the work piece, the latter is caused to advance with the feed pipe 2 in a direction to the right, i.e. as described hereinabove, in connection with FIGS. 1 to 5, in order to bring about a final corrugating action by the members 5 or 5' upon that zone of the work piece which was partially corrugated in the preceding operation.

Upon completion of the corrugating operation, the head 25 returns into the position of FIG. 1 to move the units 4 and their die members 19 or 19' away from the work piece and to simultaneously withdraw the ribs 40 inwardly and away from contact with the interior of the work piece by axially shifting the conical end 42a of spreading rod 42 in a direction to the left with respect to the slotted sleeve 38, that is, out of the conical space 41a. The sleeve 38 then returns into its unstressed or unexpanded position and is fully disengaged from the work piece so that it can follow the return movement of feed pipe 2 in a direction to the left under the action of lever 29 which latter then moves in counterclockwise direction. Thus, the movements of pipe 2 and of sleeve 38 in a direction to the left occur without moving the workpiece.

Most frequently, the corrugating apparatus of my invention is utilized for imparting flexibility to tubular work pieces of circular cross-sectional contour, i.e. the inner or operating end of each die member and of each lamination is of arcuate or segmental configuration. However, it will be readily understood that the corrugating apparatus may be utilized in connection with work pieces of oval or polygonal (e.g. square or rectangular) cross-sectional contour. All that is necessary is to substitute a different set of corrugating units and a different assembly for internally supporting the work piece. For example, a work piece of square cross-sectional contour will be corrugated with the help of four corrugating units having flat claws (corresponding to members 6, 6a and 20 or 34) and by using a square mandrel for internally supporting the work piece during each corrugating step.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for forming circumferential corrugations in an elongated tubular work piece which comprises, in combination: a tubular feed pipe for receiving and conveying the work piece, said pipe having a plurality of radially arranged cutouts; a plurality of uniformly spaced corrugating units, one for each of said cutouts and each pivotally connected to said pipe for radial movements toward and away from the work piece, each unit comprising a plurality of laminar corrugating members having claws extendable through the respective cutouts into engagement with the periphery of the work piece, the claws forming a series of endless annuli about the work piece when said units are pivoted toward the latter; means for pivoting said units toward and away from the work pieces; resilient means for constantly biasing the corrugating members of each unit away from each other in the longitudinal direction of the work piece; and means for moving the corrugating members toward each other against the bias of said resilient means when the corrugating members engage with the work piece whereby the portion of the work piece engaged by said members is formed with circumferential corrugations.

2. An apparatus for forming circumferential corrugations in an elongated tubular work piece which comprises, in combination: a tubular feed pipe for receiving and conveying the work piece, said pipe having a plurality of radially arranged cutouts; a plurality of uniformly spaced corrugating units, one for each of said cutouts and each pivotally connected to said pipe for radial movements toward and away from the work piece, each unit comprising a plurality of laminar corrugating members having claws extendable through the respective cutouts into engagement with the periphery of the work piece, the claws forming a series of endless annuli about the work piece when said units are pivoted toward the latter; means for pivoting said units toward and away from the work pieces; resilient means for constantly biasing the corrugating members of each unit away from each other in the longitudinal direction of the work pieces; abutment means in each of said units for arresting the movements of said members under the bias of said resilient means; and means for moving the corrugating members toward each other against the bias of said resilient means when the corrugating members engage with the work piece whereby the portion of the work piece engaged by said members in spaced-apart position is compressed in the longitudinal direction of the work piece and is thereby formed with circumferential corrugations.

3. An apparatus for forming circumferential corrugations in an elongated tubular work piece which comprises, in combination: a tubular feed pipe for receiving and conveying the work piece, said pipe having a plurality of radially arranged cutouts; means for reciprocating said pipe in two opposing directions longitudinally of the work piece; a plurality of uniformly spaced corrugating units, one for each of said cutouts and each pivotally connected to said pipe for radial movements toward and away from the work piece, each unit comprising a plurality of laminar corrugating members having claws extendable through the respective cutouts into engagement with the periphery of the work piece, the claws forming a series of endless annuli about the work piece when said units are pivoted toward the latter; means for pivoting said units toward and away from the work pieces; resilient means for constantly biasing the corrugating members of each unit away from each other in the longitudinal direction of the work pieces; arresting means for causing movements of the corrugating members toward each other against the bias of said resilient means when the corrugating members engage with the work piece whereby the portion of the work piece engaged by said members is formed with circumferential corrugations, said arresting means comprising a stationary cylindrical member located in said feed pipe and in the path of the corrugating members when said units are advanced with the feed pipe in one of said directions and the corrugating members are in engagement with the work piece, said reciprocating means thereupon returning the feed pipe and the corrugating units in the other of said directions whereby to move the corrugating members into position to engage with a non-corrugated portion of the work piece.

4. An apparatus for forming circumferential corrugations in an elongated tubular work piece which comprises, in combination: a tubular feed pipe for receiving and conveying the work piece, said pipe having a plurality of radially arranged cutouts; a plurality of uniformly spaced corrugating units, one for each of said cutouts and each pivotally connected to said pipe for radial movements toward and away from the work piece, each unit comprising a housing having an open side turned toward the work piece and a plurality of laminar corrugating members in said housing, each member having claw means projecting through the open side of the respective housing and extendable through the respective cutouts into engagement with the periphery of the work piece, said claw means, forming a series of endless annuli about the work piece when said units are pivoted toward the latter; means for pivoting said units toward and away from the work pieces; resilient means for constantly biasing the corrugating members of each unit away from each other in the longitudinal direction of the work piece; and means for moving the corrugating members toward each other against the bias of said resilient means when the claw means of said corrugating members engage with the work piece whereby the portions of the work piece engaged by said members is formed with circumferential corrugations.

5. An apparatus for forming circumferential corrugations in an elongated tubular work piece which comprises, in combination: a tubular feed pipe for receiving and conveying the work piece, said pipe having a plurality of uniformly spaced radially arranged cutouts; a plurality of uniformly spaced corrugating units, one for each of said cutouts and each pivotally connected to said feed pipe for radial movements toward and away from the work piece, each corrugating unit comprising a housing having an open side turned toward the work piece, a pressure plate in the housing, and a plurality of laminar corrugating members in the housing, each corrugating member having one end in abutment with said pressure plate and another end formed with claw means projecting through the open side of the housing and extendable through the respective cutout into engagement with the periphery of the work piece, the claw means forming a series of endless annuli about the work piece when said corrugating units are pivoted toward the latter; means for pivoting said corrugating units toward and away from the work piece; resilient means for constantly biasing the corrugating members of each corrugating unit away from each other in the longitudinal direction of the work piece; and means for moving the corrugating members toward each other against the bias of said resilient means when the claw means of the corrugating members engage with the work piece and their first mentioned ends bear against the respective pressure plates whereby the portion of the work piece engaged by said corrugating members is formed with circumferential corrugations.

6. An apparatus for forming circumferential corrugations in an elongated tubular work piece which comprises, in combination: a tubular feed pipe for receiving and conveying the work piece, said pipe having a plurality of radially arranged cutouts; a plurality of uniformly spaced corrugating units, one for each of said cutouts and each pivotally connected to said feed pipe for radial movements toward and away from the work piece, each corrugating unit comprising a composite housing having an open side turned toward the work piece, bolt means parallel with the longitudinal direction of the work piece for holding the components of the housing in assembled position, a pin parallel with the bolt means and mounted in the housing, and a plurality of laminar corrugating members having openings for loosely receiving said pin and said bolt means, each corrugating member being formed with claw means projecting through the open side of the housing and extendable through the respective cutout into engagement with the periphery of the work piece, said claw means forming a series of endless annuli about the work piece when the corrugating units are pivoted toward the latter; means for pivoting said corrugating units toward and away from the work piece; resilient means for constantly biasing the corrugating members of each corrugating unit away from each other in the longitudinal direction of the work piece; and means for moving the corrugating members toward each other against the bias of said resilient means when the claw means of the corrugating members engage with the work piece whereby the portion of the work piece engaged by the claw means of said corrugating members is formed with circumferential corrugations.

7. An apparatus for forming circumferential corrugations in an elongated tubular work piece which comprises, in combination: a tubular feed pipe for receiving and conveying the work piece, said pipe having a plurality of uniformly spaced radially arranged cutouts; a plurality of uniformly spaced corrugating units, one for each of said cutouts and each pivotally connected to said pipe for radial movements toward and away from the work piece, each unit comprising a plurality of laminar corrugating members having claws extendable through the respective cutouts into engagement with the periphery of the work piece, the claws having inclined end faces and interlocking with each other to form a series of endless annuli about the work piece when said units are pivoted toward the latter; means for pivoting said units toward and away from the work piece; resilient means for constantly biasing the corrugating members of each unit away from each other in the longitudinal direction of the work piece; and means for moving the corrugating members toward each other against the bias of said resilient means when the corrugating members engage with the work piece whereby the portion of the work piece engaged by the claws of said members if formed with circumferential corrugations.

8. An apparatus for forming circumferential corrugations in an elongated tubular work piece which comprises, in combination: a tubular feed pipe for receiving and conveying the work piece, said feed pipe having a plurality of radially arranged cutouts; means for reciprocating said pipe in two opposing directions longitudinally of the work piece for advancing the work piece when the feed tube is moved on one direction and for returning the feed tube without the work piece when the feed tube is moved in the other direction; a plurality of uniformly spaced corrugating units, one for each of said cutouts and each pivotally connected to said feed pipe for radial movements toward and away from the work piece, each corrugating unit comprising a housing having an open side turned toward the work piece, a plurality of parallel laminar corrugating members in the housing, each corrugating member having claw means projecting through the open side of the housing and extendable through the respective cutout in the feed pipe into engagement with the periphery of the work piece, said claw means forming a series of endless annuli about the work piece when said corrugating units are pivoted toward the latter, resilient means in the housing for constantly biasing said corrugating members in directions away from each other, said resilient means acting in said one direction and located at the inlet side of the housing, and abutment means located at the exit side of the housing for arresting the movements of said corrugating members away from each other under the bias of said resilient means; means for pivoting said corrugating units toward and away from the work piece; and means for moving the corrugating members in each housing toward each other against the bias of said resilient means when the corrugating members engage with the work piece whereby the portion of the work piece engaged by the claw means of said corrugating members in spaced apart position is compressed in the longitudinal direction of the work piece and is thereby formed with circumferential corrugations.

9. An apparatus for forming circumferential corrugations in an elongated tubular work piece which comprises, in combination: a tubular feed pipe for receiving and conveying the work piece, said feed pipe having a plurality of radially arranged cutouts; means for reciprocating said pipe in two opposing directions longitudinally of the work piece for advancing the work piece when the feed tube is moved in one direction and for returning the feed tube without the work piece when the feed tube is moved in the other direction; a plurality of uniformly spaced corrugating units, one for each of said cutouts and each pivotally connected to said feed pipe for radial movements toward and away from the work piece, each corrugating unit comprising a housing having an open side turned toward the work piece, a plurality of parallel laminar corrugating members in the housing, each corrugating member having claw means projecting through the open side of the housing and extendable through the respective cutout in the feed pipe into engagement with the periphery of the work piece, said claw means forming a series of endless annuli about the work piece when said corrugating units are pivoted toward the latter, resilient means in the housing for constantly biasing said corrugating members in directions away from each other, said resilient means acting in said one direction and located at the inlet side of the housing, and abutment means located at the exit side of the housing for arresting the movements of said corrugating members away from each other under the bias of said resilient means, said abutment means consisting of a plate like member having steps adapted to arrest the corrugating members in spaced-apart position against the bias of said resilient means; means for pivoting said corrugating units toward and away from the work piece; and means for moving the corrugating members in each housing toward each other against the bias of said resilient means when the corrugating members engage with the work piece whereby the portion of the work piece engaged by the claw means of said corrugating members in spaced apart position is compressed in the longitudinal direction of the work piece and is thereby formed with circumferential corrugations.

10. An apparatus for forming circumferential corrugations in an elongated tubular work piece which comprises, in combination: a tubular feed pipe for receiving and conveying the work piece, said pipe having a plurality of radially arranged cutouts; means for reciprocating the feed pipe from a starting position in a first direction to advance the work piece and in a second direction counter to said first direction to return the feed pipe into said starting position; a plurality of uniformly spaced corrugating units, one for each of said cutouts and each pivotally connected to the feed pipe for radial movements toward and away from the work piece, each corrugating unit comprising a housing having an open side turned toward the work piece, a plurality of laminar corrugating members in the housing, said corrugating members having claw means projecting through the open side of the housing, extendable through the respective cutout into engagement with the periphery of the work piece and forming a series of endless annuli about the work piece when the corrugating units are pivoted toward the latter, resilient means for constantly biasing the corrugating members away from each other in the longitudinal direction of the work piece, a die member connected to the housing and having a plurality of rigidly interconnected grippers extending through the respective cutout and engaging with a non-corrugated portion of the work piece when the corrugating units are moved toward the latter whereby the grippers partially corrugate the work piece, the overall length of said die member in the longitudinal direction of the work piece equaling the distance between the outermost corrugating members in spaced apart position and said die member being located in advance of the corrugating members whereby to partially corrugate that portion of the work piece which is corrugated by said members in the next operation; and means for moving the corrugating members toward each other against the bias of said resilient means when the claw means of said corrugating members engage with the work piece whereby the portion of the work piece engaged by said corrugating members is formed with circumferential corrugations, and for moving the grippers into engagement with the work piece.

11. An apparatus for forming circumferential corrugations in an elongated tubular work piece which comprises, in combination: a tubular feed pipe for receiving and conveying the work piece, said pipe having a plurality of radially arranged cutouts; means for reciprocating the feed pipe from a starting position in a first direction to advance the work piece and in a second direction counter to said first direction to return the feed pipe into said starting position; a plurality of uniformly spaced corrugating units, one for each of said cutouts and each pivotally connected to the feed pipe for radial movements toward and away from the work piece, each corrugating unit comprising a housing having an open side turned toward the work piece, a plurality of laminar corrugating members in the housing, said corrugating members having claw means projecting through the open side of the housing, extendable through the respective cutout into engagement with the periphery of the work piece and forming a series of endless annuli about the work piece when the corrugating units are pivoted toward the latter, resilient means for constantly biasing the corrugating members away from each other in the longitudinal direction of the work piece, a die member having a plurality of rigidly interconnected grippers extending through the respective cutout and engaging with a non-corrugated portion of the work piece when the corrugating units are moved toward the latter whereby the grippers partially corrugate the work piece, said die member being located in advance of the corrugating members whereby to partially corrugate that portion of the work piece which is corrugated by said members in the next operation; and means for moving the corrugating members toward each other against the bias of said resilient means when the claw means of said corrugating members engage with the work piece whereby the portion of the work piece engaged by said corrugating members if formed with circumferential corrugations, and for moving the grippers into engagement with the work piece.

12. An apparatus for forming circumferential corrugations in an elongated tubular work piece which comprises, in combination: a tubular feed pipe for receiving and conveying the work piece, said pipe having a plurality of radially arranged cutouts; means for reciprocating the feed pipe from a starting position in a first direction to advance the work piece and in a second direction counter to said first direction to return the feed pipe into said starting position; a plurality of uniformly spaced corrugating units, one for each of said cutouts and each pivotally connected to the feed pipe for radial movements toward and away from the work piece, each corrugating unit comprising a housing having an open side turned toward the work piece, a plurality of laminar corrugating members in the housing, said corrugating members having claw means projecting through the open side of the housing, extendable through the respective cutout into engagement with the periphery of the work piece and forming a series of endless annuli about the work piece when the corrugating units are pivoted toward the latter, resilient means for constantly biasing the corrugating members away from each other in the longitudinal direction of the work piece, a die member connected to the housing and having a plurality of rigidly interconnected grippers extending through the respective cutout and engaging with a non-corrugated portion of the work piece when the corrugating units are moved toward the latter whereby the grippers partially corrugate the work piece, the overall length of said die member in the longitudinal direction of the work piece equaling the distance between the outermost corrugating members in spaced apart position and said die member being located in advance of the corrugating members whereby to partially corrugate that portion of the work piece which is corrugated by said members in the next operation; and means for moving the corrugating members toward each other against the bias of said resilient means when the claw means of said corrugating members engage with the work piece whereby the portion of the work piece engaged by said corrugating members is formed with circumferential corrugations, and for moving the grippers into engagement with the work piece, the position of said grippers with respect to said corrugating members being such that the grippers engage with the work piece before the latter is engaged by the claw means of said corrugating members when the corrugating units are pivoted toward the work piece.

13. An apparatus for forming circumferential corrugations in an elongated tubular work piece which comprises, in combination: a tubular feed pipe for receiving and conveying the work piece, said pipe having a plurality of radially arranged cutouts; means for reciprocating the feed pipe from a starting position in a first direction to advance the work piece and in a second direction counter to said first direction to return the feed pipe into said starting position; a plurality of uniformly spaced corrugating units, one for each of said cutouts and each pivotally connected to the feed pipe for radial movements toward and away from the work piece, each corrugating unit comprising a housing having an open side turned toward the work piece, a plurality of laminar corrugating members in the housing, said corrugating members having claw means projecting through the open side of the housing, extendable through the respective cutout into engagement with the periphery of the work piece and forming a series of endless annuli about the work piece when the corrugating units are pivoted toward the latter, resilient means for constantly biasing the corrugating members away from each other in the longitudinal direction of the work piece, a die member connected to the housing and having a plurality of rigidly interconnected grippers extending through the respective cutout and engaging with a non-corrugated portion of the work piece when the corrugating units are moved toward the latter whereby the grippers partially corrugate the work piece, the overall length of said die member in the longitudinal direction of the work piece equaling the distance between the outermost corrugating members in spaced apart position and said die member being located in advance of the corrugating members whereby to partially corrugate that portion of the work piece which is corrugated by said members in the next operation, the grippers of adjacent die members being formed with alternating edges and gaps and being staggered in the longitudinal direction of the work piece whereby the edges of the grippers enter the gaps of the adjacent grippers when the corrugating units are pivoted toward the work piece and the grippers form a series of endless annuli about the work piece; and means for moving the corrugating members toward each other against the bias of said resilient means when the claw means of said corrugating members engage with the work piece whereby the portion of the work piece engaged by said corrugating members is formed with circumferential corrugations, and for moving the grippers into engagement with the work piece.

14. An apparatus for forming circumferential corrugations in an elongated tubular work piece which comprises, in combination: a tubular feed pipe for receiving and conveying the work piece, said pipe having a plurality of radially arranged cutouts; means for reciprocating the feed pipe from a starting position in a first direction to advance the work piece and in a second direction counter to said first direction to return the feed pipe into said starting position; a plurality of uniformly spaced corrugating units, one for each of said cutouts and each pivotally connected to the feed pipe for radial movements toward and away from the work piece, each corrugating unit comprising a housing having an open side turned toward the work piece, a plurality of laminar corrugating members in the housing, said corrugating members having claw means projecting through the open side of the housing, extendable through the respective cutout into engagement with the periphery of the work piece and forming a series of endless annuli about the work piece when the corrugating units are pivoted toward the latter, resilient means for constantly biasing the corrugating members away from each other in the longitudinal direction of the work piece, a die member connected to the housing and having a plurality of rigidly interconnected grippers extending through the respective cutout and engaging with a non-corrugated portion of the work piece when the corrugating units are moved toward the latter whereby the grippers partially corrugate the work piece, the overall length of said die member in the longitudinal direction of the work piece equaling the distance between the outermost corrugating members in spaced apart position and said die member being located in advance of the corrugating members whereby to partially corrugate that portion of the work piece which is corrugated by said members in the next operation, the grippers of adjacent die members being formed with edges and gaps arranged in such a manner that the edges of grippers on one die member enter the gaps of grippers in the adjacent die member when the corrugating units are pivoted toward the work piece whereby the grippers form a series of endless annuli about the work piece; and means for moving the corrugating members toward each other against the bias of said resilient means when the claw means of said corrugating members engage with the work piece whereby the portion of the work piece engaged by said corrugating members if formed with circumferential corrugations, and for moving the grippers into engagement with the work piece.

15. An apparatus for forming circumferential corrugations in an elongated tubular work piece which comprises, in combination: a tubular feed pipe for receiving and conveying the work piece, said pipe having a plurality of radially arranged cutouts; means for reciprocating the feed pipe from a starting position in a first direction to advance the work piece and in a second direction counter to said first direction to return the feed pipe into said starting position; a plurality of uniformly spaced corrugating units, one for each of said cutouts and each pivotally connected to the feed pipe for radial movements toward and away from the work piece, each corrugating unit comprising a housing having an open side turned toward the work piece, a plurality of laminar corrugating members in the housing, said corrugating members having claw means projecting through the open side of the housing, extendable through the respective cutout into engagement with the periphery of the work piece and forming a series of endless annuli about the work piece when the corrugating units are pivoted toward the latter, resilient means for constantly biasing the corrugating members away from each other in the longitudinal direction of the work piece, a die member connected to the housing and having a plurality of integral grippers extending through the respective cutout and engaging with a non-corrugated portion of the work piece when the corrugating units are moved toward the latter whereby the grippers partially corrugate the work piece, the overall length of said die member in the longitudinal direction of the work piece equaling the distance between the outermost corrugating members in spaced apart position and said die member being located in advance of the corrugating members whereby to partially corrugate that portion of the work piece which is corrugated by said members in the next operation; and means for moving the corrugating members toward each other against the bias of said resilient means when the claw means of said corrugating members engage with the work piece whereby the portion of the work piece engaged by said corrugating members is formed with circumferential corrugations, and for moving the grippers into engagement with the work piece.

16. An apparatus for forming circumferential corrugations in an elongated tubular work piece which comprises, in combination: a tubular feed pipe for receiving and conveying the work piece, said pipe having a plurality of radially arranged cutouts; a plurality of uniformly spaced corrugating units, one for each of said cutouts and each pivotally connected to said pipe for radial movements toward and away from the work piece, each unit comprising a plurality of laminar corrugating members having claws extendable through the respective cutouts into engagement with the periphery of the work piece, the claws forming a series of endless annuli about the work piece when said units are pivoted toward the latter; means for pivoting said units toward and away from the work piece; a smooth-surfaced mandrel extending into the work piece for internally supporting the same when the claws of said members engage the periphery of the work piece; resilient means for constantly biasing the corrugating members of each unit away from each other in the longitudinal direction of the work pieces; and means for moving the corrugating members toward each other against the bias of said resilient means when the corrugating members engage with the work piece whereby the portion of the work piece engaged by said members is formed with circumferential corrugations.

17. An apparatus for forming circumferential corrugations in an elongated tubular work piece which comprises, in combination: a tubular feed pipe for receiving and conveying the work piece, said pipe having a plurality of radially arranged cutouts; means for reciprocating the feed pipe from a starting position in a first direction to advance the work piece and in a second direction counter to said first direction to return the feed pipe into said starting position; a plurality of uniformly spaced corrugating units, one for each of said cutouts and each pivotally connected to the feed pipe for radial movements toward and away from the work piece, each corrugating unit comprising a housing having an open side turned toward the work piece, a plurality of laminar corrugating members in the housing, said corrugating members having claw means projecting through the open side of the housing, extendable through the respective cutout into engagement with the periphery of the work piece and forming a series of endless annuli about the work piece when the corrugating units are pivoted toward the latter, resilient means for constantly biasing the corrugating members away from each other in the longitudinal direction of the work piece, a die member connected to the housing and having a plurality of rigidly interconnected grippers extending through the respective cutout and engaging with a non-corrugated portion of the work piece when the corrugating units are moved toward the latter whereby the grippers partially corrugate the work piece, the overall length of said die members in the longitudinal direction of the work piece equaling the distance between the outermost corrugating members in spaced apart position and said die member being located in advance of the corrugating members whereby to partially corrugate that portion of the work piece which is corrugated by said members in the next operation; a smooth-surfaced mandrel extending into the work piece for internally supporting the same against crushing when the claws of said corrugating members and the grippers of said die members engage the periphery of the work piece; and means for moving the corrugating members toward each other against the bias of said resilient means when the claw means of said corrugating members engage with the work piece whereby the portion of the work piece engaged by said corrugating members is formed with circumferential corrugations, and for moving the grippers into engagement with the work piece.

18. An apparatus for forming circumferential corrugations in an elongated tubular work piece which comprises, in combination: a tubular feed pipe for receiving and conveying the work piece, said pipe having a plurality of radially arranged cutouts; a plurality of uniformly spaced corrugating units, one for each of said cutouts and each pivotally connected to said pipe for radial movements toward and away from the work piece, each unit comprising a plurality of laminar corrugating members having claws extendable through the respective cutouts into engagement with the periphery of the work piece, the claws forming a series of endless annuli about the work piece when said units are pivoted toward the latter; means for pivoting said units toward and away from the work piece; means for internally supporting the work piece when the latter's periphery is engaged by the claws of said corrugating members, said supporting means comprising a hollow slotted mandrel extending into the work piece and formed with circumferential ribs adjacent to said cutouts, and means reciprocably received in the mandrel for expanding the same whereby said ribs engage the inner side of the work piece and support the same against crushing by the claws of said corrugating members; resilient means for constantly biasing the corrugating members of each unit away from each other in the longitudinal direction of the work piece; and means for moving the corrugating members toward each other against the bias of said resilient means when the corrugating members engage with the work piece whereby the portion of the work piece engaged by said members is formed with circumferential corrugations.

19. An apparatus for forming circumferential corrugations in an elongated tubular work piece which comprises, in combination: a tubular feed pipe for receiving and conveying the work piece, said pipe having a plurality of radially arranged cutouts; means for reciprocating the feed pipe from a starting position in a first direction to advance the work piece and in a second direction counter to said first direction to return the feed pipe into said starting position; a plurality of uniformly spaced corrugating units, one for each of said cutouts and each pivotally connected to the feed pipe for radial movements toward and away from the work piece, each corrugating unit comprising a housing having an open side turned toward the work piece, a plurality of laminar corrugating members in the housing, said corrugating members having claw means projecting through the open side of the housing, extendable through the respective cutout into engagement with the periphery of the work piece and forming a series of endless annuli about the work piece when the corrugating units are pivoted toward the latter, resilient means for constantly biasing the corrugating members away from each other in the longitudinal direction of the work piece, a die member connected to the housing and having a plurality of rigidly interconnected grippers extending through the respective cutout and engaging with a non-corrugated portion of the work piece when the corrugating units are moved toward the latter whereby the grippers partially corrugate the work piece, the overall length of said die member in the longitudinal direction of the work piece equaling the distance between the outermost corrugating members in spaced apart position and said die member being located in advance of the corrugating members whereby to partially corrugate that portion of the work piece which is corrugated by said members in the next operation; means for internally supporting the work piece when the latter's periphery is engaged by the claws of said corrugating members and by the grippers of said die members, said supporting means comprising a hollow slotted mandrel extending into the work piece, said mandrel having a smooth-surfaced portion aligned with the claws of said corrugating members and a portion formed with circumferential ribs aligned with said die members and located between the adjacent grippers, and means reciprocably received in the mandrel for expanding the same whereby the ribs engage with the inner side of the work piece internally of said grippers and said smooth-surfaced portion engages with the inner side of the work piece internally of said claws for preventing crushing of the work piece when the latter is engaged by said grippers and said claws; and means for moving the corrugating members toward each other against the bias of said resilient means when the claw means of said corrugating members engage with the work piece whereby the portion of the work piece engaged by said corrugating members is formed with circumferential corrugations, and for moving the grippers into engagement with the work piece.

20. The method of forming circumferential corrugations in a tubular work piece which comprises the steps of successively subjecting equal peripheral portions of the work piece to the action of radially reciprocable partially and finally corrugating instrumentalities; and intermittently advancing the work piece in the same direction through distances equal to the length of said peripheral portions to move new portions of the work piece into alignment with said partially corrugating instrumentalities and to move the partially corrugated portions of the work piece into alignment with the finally corrugating instrumentalities.

21. The method of forming circumferential corrugations in a cylindrical work piece which comprises the steps of successively subjecting two adjacent peripheral portions of the work piece to the action, respectively, of radially reciprocable partially corrugating and finally corrugating instrumentalities; and intermittently advancing the work piece in the same direction through distances equal in length to the length of one of said portions whereby the partially corrugated portions of the work piece are finally corrugated in the next corrugating step.

22. The method of forming circumferential corrugations in a tubular work piece which comprises the steps of successively subjecting two adjacent peripheral portions of the work piece to the action, respectively, of radially reciprocable partially corrugating and finally corrugating instrumentalities; intermittently advancing the work piece in the same direction through distances equal in length to the length of one of said portions whereby the partially corrugated portions of the work piece are finally corrugated in the next corrugating step; and continuously supporting the interior of such portions of the work piece which are acted upon by said instrumentalities.

References Cited in the file of this patent

UNITED STATES PATENTS

| | | |
|---|---|---|
| 2,347,101 | Harding | Apr. 18, 1944 |
| 2,631,645 | Friedman | Mar. 17, 1953 |
| 2,866,230 | Holt | Dec. 30, 1958 |